US011378115B2

(12) United States Patent
Sjostedt et al.

(10) Patent No.: US 11,378,115 B2
(45) Date of Patent: Jul. 5, 2022

(54) FURNITURE AND ASSEMBLY METHOD

(71) Applicant: IKEA Supply AG, Pratteln (CH)

(72) Inventors: Goran Sjostedt, Killeberg (SE); Anders Eriksson, Virestad (SE)

(73) Assignee: IKEA Supply AG, Pratteln (CH)

( * ) Notice: Subject to any disclaimer, the term of this patent is extended or adjusted under 35 U.S.C. 154(b) by 240 days.

(21) Appl. No.: 16/769,191

(22) PCT Filed: Oct. 9, 2018

(86) PCT No.: PCT/SE2018/051036
§ 371 (c)(1),
(2) Date: Jun. 2, 2020

(87) PCT Pub. No.: WO2019/117777
PCT Pub. Date: Jun. 20, 2019

(65) Prior Publication Data
US 2020/0370584 A1 Nov. 26, 2020

(30) Foreign Application Priority Data

Dec. 11, 2017 (SE) .................... 1751521-4

(51) Int. Cl.
F16B 12/10 (2006.01)
A47C 4/02 (2006.01)
A47B 3/06 (2006.01)

(52) U.S. Cl.
CPC ............... *F16B 12/10* (2013.01); *A47C 4/02* (2013.01); *A47B 3/06* (2013.01); *F16B 2012/103* (2013.01)

(58) Field of Classification Search
CPC .......... F16B 12/10; F16B 12/22; F16B 12/24; F16B 12/34; F16B 12/36; A47C 4/02; A47B 57/22
See application file for complete search history.

(56) References Cited

U.S. PATENT DOCUMENTS 2,534,413 A 12/1950 Cenis
3,634,983 A 1/1972 Welch
(Continued)

FOREIGN PATENT DOCUMENTS

DE 365461 C 12/1922
DE 3438854 A1 4/1986
(Continued)

OTHER PUBLICATIONS

Extended European Search Report for EP Application No. 18888624.5 dated Aug. 2, 2021 (7 pages).
(Continued)

Primary Examiner — Daniel J Wiley
(74) Attorney, Agent, or Firm — Merchant & Gould P.C.

(57) ABSTRACT

A piece of furniture includes:
  a first and a second resilient section (100A, 100B) mutually displaced from each other forming a gap (G) there between;
  a cross-member (200) configured to connect with the first section and the second section thereby bridging the gap; and
  a first and a second joint arrangement (300A, 300B) configured to attach the cross-member to the first and second section, respectively;
  wherein each of the first and second joint arrangements comprises a pair of:
  a male part (320) formed by a dowel (321) extending in a longitudinal direction and having a free end (322) facing away from a surface (101A, 101B) of the respective section or away from the surface of the cross-member; and
  a female part (330) formed by a recess (331) in the surface of the cross-member or in the surface of the respective section, the recess having a recess extent with an
(Continued)

insertion portion (332), an intermediate portion (333), and a locking portion (335);

wherein as the respective dowel passes a section biasing portion (334) in the intermediate portion, the first and second sections are resiliently displaced and as the dowel reaches the locking portion the sections are relaxed.

16 Claims, 12 Drawing Sheets

(56) References Cited

U.S. PATENT DOCUMENTS

| | | | |
|---|---|---|---|
| 4,258,464 A * | 3/1981 | Ullman, Jr. | A47B 57/22 403/353 |
| 4,332,205 A | 6/1982 | Corl, Jr. | |
| 5,688,030 A | 11/1997 | McAnally et al. | |
| 9,447,804 B2 * | 9/2016 | Andersson | F16B 12/125 |
| 10,844,891 B2 * | 11/2020 | Maertens | F16B 12/46 |
| 2014/0205373 A1 | 7/2014 | Andersson et al. | |
| 2017/0321734 A1 | 11/2017 | Maertens et al. | |
| 2018/0283431 A1 * | 10/2018 | Andersson | F16B 12/22 |

FOREIGN PATENT DOCUMENTS

| | | |
|---|---|---|
| DE | 29810385 U1 | 2/1999 |
| EP | 1291533 A2 | 3/2003 |
| WO | 2016137385 A1 | 9/2016 |

OTHER PUBLICATIONS

International Search Report for International Application No. PCT/SE2018/051036 dated Jan. 7, 2019 (4 pages).

* cited by examiner

FURNITURE AND ASSEMBLY METHOD

This application is a National Stage Application of PCT/SE2018/051036, filed 9 Oct. 2018, which claims benefit of Serial No. 1751521-4, filed 11 Dec. 2017 in Sweden and which applications are incorporated herein by reference. To the extent appropriate, a claim of priority is made to each of the above disclosed applications.

FIELD OF INVENTION

The invention relates to a furniture comprising a frame having a first section and a second section mutually displaced from each other to form a gap there between and a cross-member configured to connect with the first section and the second section thereby bridging the gap.

TECHNICAL BACKGROUND

Many different ways have been used throughout the years to join furniture parts to each other. Often different types of mechanical fastening means are used. For self-assembly furniture it is important that the different furniture parts can be assembled to each other in a safe and relatively simple way. This is especially important when the end user is to assemble the furniture on his/her own. It is therefore typically an aspiration to improve the joints between the different furniture parts. The improvements may concern the mechanical stability of the joint, i.e. how well the furniture parts are assembled to each other. They may also concern the manufacturing costs, ease of assembly etc. Another important aspect to consider is the handling of the furniture parts from factory to the customer. The parts should allow space efficient packaging to reduce packaging costs and transportation cost.

SUMMARY OF INVENTION

An object of the invention is to provide a piece of furniture with joint arrangements which may easily be assembled and disassembled. It is desirable that the piece of furniture may be assembled without the need of any separate fastening means and without the use of any tools. It is desirable that the joint is easy to assemble and yet give a secure assembly of the furniture parts. It is desirable that the furniture after assembly may once again be disassembled without damaging the furniture parts. It is desirable that the joint is designed such that it is easy to manufacture the different furniture parts. It is desirable that the joint is invisible when the piece of furniture has been assembled. The assembled furniture, such as a chair, should provide a high degree of robustness that can withstand the often high forces that especially a chair is subjected to.

This object has in accordance with a first aspect of the invention been achieved by a piece of furniture comprising:

a first section and a second section mutually displaced from each other forming a gap there between;

wherein the first section and the second section are resilient relative to each other such that the gap may be widened or partly reduced by application of a force;

a cross-member configured to connect with the first section and the second section thereby bridging the gap, the cross-member having a surface configured to face the first section and the second section;

a first joint arrangement configured to attach the cross-member to the first section; and a second joint arrangement configured to attach the cross-member to the second section;

wherein each of the first and second joint arrangements comprises a pair of:

a male part being arranged either on the surface of the cross-member or being arranged on the respective first or second section; and a female part being arranged on the other one of the surface of the cross-member and the respective first or second section;

wherein each of the male parts is formed by a dowel extending in a longitudinal direction and having a free end facing away from a surface of the respective section or away from the surface of the cross-member, wherein each of the female parts is formed by a recess in the surface of the cross-member or in the surface of the respective section, the recess having a recess extent with an insertion portion, an intermediate portion, and a locking portion, whereby the respective dowel is configured to first be moved relative to the associated recess in the longitudinal direction of respective dowel into the insertion portion and thereafter be moved along the extent via the intermediate portion to the locking portion by moving the cross-member relative to the first and second sections in a travel direction having a main component orthogonal to the gap, wherein the locking portion is configured to engage with the dowel such that the dowel is prevented from being removed from the associated recess along a longitudinal direction of the dowel when the dowel is located in the locking portion of the associated recess, wherein the recess is shaped such that as the respective dowel passes a section biasing portion in the intermediate portion of the associated recess, the first and second sections are resiliently forced away from each other providing a widened gap or forced towards each other providing a reduced gap and as the dowel reaches the locking portion the sections are relaxed compared to when the dowel passes the section biasing portion, thereby providing a bias of the dowel towards the locking portion once it has been transferred past the section biasing portion.

By configuring the sections and cross-member to be moved relative to each other such that the dowels are moved relative to the recesses in the longitudinal direction of respective dowel into the insertion portion of the respective recess and thereafter moved along the recess extent to the locking portion of the respective recess, the cross-member will be locked to the sections in a direction along a longitudinal extent of the sections. The dowels are, when they have passed the section biasing portion, biased towards the locking portion which ensures that the dowels are forced towards the locking portions such that an interlocking of the cross-member is achieved without requiring any tooling. The interlocking provides a robust mechanical design which may be used for a wide variety of furniture and parts thereof.

At least the locking portion, and preferably also the intermediate portion, is adapted to engage with the dowel, such that the dowel is prevented from being removed from the recess along a longitudinal direction of the dowel, when the dowel is located in the locking portion, and potentially also when the dowel is located in the intermediate portion, of the associated recess. By arranging the locking portion, and preferably also the intermediate portion, to engage the dowel along a longitudinal direction along the longitudinal extent of the dowel, a distinct guiding and a three-dimensional interlocking of the dowel may be achieved without requiring any tooling.

It may be said that the insertion, intermediate, and locking portions of respective recess is included in a single recess and that these portions are located along the recess extent thereby providing a recess in which the male part may be slid along the recess extent.

The section biasing portion is a portion along the recess extent wherein when the dowel of each joint arrangement is at this respective biasing portion, the sections are displaced from their relaxed position. The section biasing portion may be a portion along the recess extent wherein when the dowel of each joint arrangement is at this respective biasing portion, the sections are maximally displaced from their relaxed position. The section biasing portion may coincide with the insertion portion, however it is currently preferred that the section biasing portion is located between the insertion portion and the locking portion. One way of accomplishing this is to arrange the recesses of the first joint arrangement and the recesses of the second joint arrangement to be mirrored in relation to an equidistant plane normal to the gap direction when the furniture is assembled. This allows the sections to be displaced either towards each other or away from each other.

The recesses of the first and second joint arrangement may be provided on the cross member whereby a distance between a dowel of the first joint arrangement and a respective dowel of the second joint arrangement, when in the associated recess and the sections are relaxed, are different than a distance between the same dowel of the first joint arrangement and the respective same dowel of the second joint arrangement when the dowels are in the section biasing portion of the associated recess. Additionally, the distance between the same dowel of the first joint arrangement and the respective same dowel of the second joint arrangement when the dowels are in the section biasing portion of the associated recess may potentially be either the largest or the smallest distance of any position of the dowels in their associated recess, such that the sections are furthest away from each other or closest together when the dowels are in the section biasing portion of the associated recess. Thereby a bias of the dowel towards the locking portion is provided once it has been transferred past the section biasing portion.

Alternatively, the respective dowel is positioned on the cross-member whereby a distance between a recess of the first joint arrangement and a respective, e.g. mirrored, recess of the second joint arrangement, when interacting with the associated dowel and the sections are relaxed, is different than a distance between the same recess of the first joint arrangement and the respective same recess of the second joint arrangement when the dowels are in the section biasing portion of the associated recess. Additionally, the distance between the same recess of the first joint arrangement and the respective same recess of the second joint arrangement when the dowels are in the section biasing portion of the associated recess may potentially be either the largest or the smallest distance of any position of the recesses, such that the sections are furthest away from each other or closest together when the dowels are in the section biasing portion of the associated recess. Thereby a bias of the dowel towards the locking portion is provided once it has been transferred past the section biasing portion.

The first and second sections may by way of example be side columns of a chair configured to form a support for a back-rest. In addition, the cross-member may form the back-rest of the chair. The first and second sections may also be side sections of a chair, where each section may comprise a front leg and a rear leg. Each of these respective sections may be a pre-assembled unit which section comprises one of the columns configured to form a support for a back-rest, a front leg, a rear leg and a lower cross-member extending between the two legs. Thus, the cross-member may constitute the back-rest which bridges the two sections.

Each recess may have a curved extent such that as the dowel is positioned in the insertion portion the sections are relaxed compared to when the dowel passes the section biasing portion. This facilitates insertion of the respective dowel into the insertion portion of the associated recess. The sections may be completely relaxed when the dowel is in the insertion portion. This provides that advantage that the dowel may be easily inserted into the insertion portion, since the dowel can be inserted without displacing the sections relative to each other and thus without requiring effort. The sections may be configured such that when the dowel is moved from the insertion portion towards the section biasing portion, the sections are displaced such that the dowel is biased towards the insertion portion, and such that the direction of the bias of the dowel changes as the dowel passes the section biasing portion, from towards the insertion portion before passing the section biasing portion to towards the locking portion after passing the section biasing portion. This provides the advantage that a self-locking effect is achieved in that the dowel will be urged towards the locking portion when passing the section biasing portion.

Each recess may be shaped and oriented such that a geometrical line segment between the insertion portion and the locking portion has a main component orthogonal to the gap. The geometrical line segment may be defined as between the centre point of the insertion portion to centre point of the locking portion. The main component of the geometrical line segment may be defined as that a projection of the geometrical line segment onto a direction orthogonal to the gap direction is greater than a projection of the geometrical line segment onto the gap direction. The geometrical line segment may have a main component parallel to a longitudinal direction of the respective section. By shaping and orienting the recess in this way the effort required to assemble the furniture is reduced, since the primary direction of travel of the dowel is in a non-biasing direction.

A geometrical line segment between a centre point of the insertion portion and a centre point of the section biasing portion may form a first slope angle with the travel direction which may be smaller than a second slope angle which may be formed between the travel direction and a geometrical line segment between the centre point of the section biasing portion and a centre point of the locking portion. This provides the advantage that the magnitude of the bias of the dowel will slowly increase as the dowel is moved from the insertion portion to the section biasing portion which eases the assembly of the furniture since the effort of assembly is divided along a longer distance. The magnitude of the bias of the dowel will thus relatively sharply increase towards the locking portion as the dowel is moved past the section biasing portion. This will typically be perceived as a tactile feedback to the person assembling the furniture. Moreover, it will require a greater force in the sliding direction of the cross-member to release the dowels from the locking portion towards the section biasing portion than required to move the dowels from the insertion portion towards the section biasing portion. It will thereby by easier to assemble the furniture than it is to disassemble the furniture, which reduces the risk of unintentional disassembly of the furniture.

Each joint arrangement may comprise:

at least two pairs of a male and a female part, the male part of each pair being arranged either on the surface of the cross-member or on the respective section, the female part of each pair being arranged on the other one, with respect to the male part of the same pair, of the surface of the cross-member or the respective section. The female part thereby complementing the male part of the same pair. The male parts of each pair may preferably be arranged on the same of the surface of the cross-member or on the respective section, while the female parts may be arranged on the other one with respect to the male parts. By having two pairs of male and female parts the cross-member can be attached to the sections with mechanical stability as the cross-member in this case has at least four attachment points.

The male part or parts may be arranged on the respective section, and the female part or parts may be arranged on the surface of the cross-member. By providing the male part or male parts on the sections, assembly of the cross-section to the sections is facilitated, and the sections may be made thinner since the male parts may have a smaller width than the female parts, the width being the distance parallel to the gap.

The sections may, apart from being connected to each other by the cross-member, also be connected to each other at another position being at a distance from the gap. The distance may be measured orthogonally to the gap and is preferably at least 25% of the gap. By having the sections connected at a distance from the gap, for instance by a seat frame, the furniture may potentially form a chair and it is easy to provide the desired resilience of the sections by e.g. using a suitably resilient material, such as a wood based material.

Each recess may have a length extending along the recess extent, a depth, and a width which varies with the recess extent and with the depth, wherein:
the insertion portion has a first width; and
the locking portion has a mouth having a third width being smaller than the first width,
wherein the dowel has, along the longitudinal direction from the free end thereof:
a first portion forming a locking segment and having a first width; and
a second portion connected to the first portion and forming a core segment and having a second width being smaller than the first width,
wherein the first width of the recess is greater than the first width of the dowel, such that the dowel can be inserted into the insertion portion of the recess, and the second width of the recess is between the first and the second width of the recess, such that the dowel is prevented from being removed along a longitudinal direction of the dowel once in the locking portion of recess.

It may be said that the first portion of the dowel is closer to the free end than the second portion. It may be said that the locking portion is formed with a groove which is formed beneath the mouth and which extends along the extent of the recess. The first portion may be said to form a ridge around the dowel. It may be said that the ridge is slidably insertable into the groove thereby allowing the dowel to be inserted into the locking portion of the recess. The section biasing portion may, and is preferably, also provided with a design similar to the design of the locking portion.

This provides the advantage that the dowel is prevented from being removed along a longitudinal direction of the dowel once in the locking portion of recess.

The width and depth directions are typically orthogonal to each other and to the recess extent. The depth direction is typically measured from the surface into which the recess is formed and towards the bottom of the recess. However, it is contemplated that the invention may be used in skewed recesses. For instance, the depth direction may be inclined relative to the normal direction of the plane formed of the recess extent and the width.

The intermediate portion may have a mouth having second width being smaller than the first width of the dowel, such that the intermediate portion prevents the dowel from being removed along a longitudinal direction of the dowel once in the intermediate portion of recess. The second width of the intermediate portion may be substantially the same as the third width at the locking portion.

The locking portion of the dowel may comprise at least one, preferably at least two, more preferably at least three, ridge(s) configured to engage respective matching groove(s) in the locking portion, and potentially the intermediate portion, of the associated recess. By having ridges and grooves the joint arrangement can achieve a good mechanically stable joint, by having a plurality of ridges and grooves the mechanical stability of the joint is further increased.

A transition portion may be provided at the transition between the insertion and section biasing portion and/or between the section biasing portion and locking portion. The transition portion may be configured to urge the dowel into the recess as the dowel passes the transition portion by having gradually increasing depth from a first depth at an entry portion of the transition portion towards a second depth at an exit portion of the transition portion and thereby urging the dowel further into the recess as the dowel passes the transition portion. An advantage is that the dowel need not be fully inserted into the insertion portion of the recess, only the locking portion of the dowel has to pass the first depth of the entrance portion, such that the dowel can be slid into the transition portion and thereby the dowel is urged towards the bottom of the recess. Alternatively, the transition portion may similarly be provided at the transition between the intermediate portion and the locking portion.

The insertion and locking portions of the recess may be generally cylindrical. This facilitates manufacturing since, the recess may be formed by milling the recess with a milling tool having a design essentially as the dowel, the milling tool being drilled into the material forming the insertion portion and then being slid along the material thereby forming the section biasing portion and the locking portion.

The dowel may be cylindrical and may have infinite cylindrical symmetry. This provides the advantage that the dowel may be used with any orientation of the dowel.

The recesses may be shaped and orientated such that as the respective dowel passes the section biasing portion in the intermediate portion of the associated recess, the first and second sections are resiliently forced towards each other providing a reduced gap. By arranging the recesses in this way, the assembly of the furniture may be facilitated, as it generally requires less effort to force the sections towards each other.

The furniture may comprise a bracing configured to be positioned between the sections to abut the sections thereby counter-acting movement of the sections towards each other. This provides the advantage that the cross member may be locked as the sections is prevented from moving towards each other and thereby the bracing prevents disassembly of the cross-member. The bracing may form substantially an X-shape and may additionally comprise a bracing cross-element which may be configured to support two lower ends of the X-shape and to bridge the distance between the sections.

The bracing may, in an assembled state of the furniture, be configured to extend into a first groove in the cross-member at a junction between the cross-member and the first section and/or in the first section, and into a second groove in the cross-member at a junction between the cross-member and the second section and/or in the second section. An advantage is that the risk of accidental removal of the bracing may be reduced.

The bracing may be configured to extend into a first groove in the cross-member at a junction between the cross-member and the first section and into a second groove in the cross-member at a junction between the cross-member and the second section. The grooves in the cross-member may extend beyond the junction between the cross-member and the respective section. The bracing may comprise a notch, which may be right-angled, at each respective section abutting at least two surfaces of the respective section. This provides the advantage that the risk of accidentally removal of the bracing may further reduced.

The bracing may comprise first locking arrangement at a connection between the bracing and the first section and a second locking arrangement at a connection between the bracing and the second section, each locking arrangement comprising a locking pin configured to be moved from a released position to a locked position in which the locking pin interacts with the respective section, wherein the locking pins, when in the locked positions, counter-act removal of the bracing from a position in-between the sections. By having such a locking arrangement, the bracing may be fixed to the sections. Each of the locking arrangements may be provided at a connection between a bracing cross-element of the bracing and the respective section. An advantage is that a bracing cross-element may be provided with dimensions more appropriate for accommodating the locking arrangement. The locking pin may have a longitudinal extent, and potentially be cylindrical, with a lower and an upper end, the lower end being configured to be inserted into an accommodating hole of locking arrangement. The locking pin may comprise a tool interface, potentially a straight slot, provided at an upper end of the locking pin and configured to interface with a tool. This provides a convenient way of adjusting the orientation of the locking pin when inserted into the bracing. In this disclosure the directions of "upper" and "lower" refers to the orientation of a pin when inserted into an element, the lower end of a pin is the end that is inserted into the element, and the upper end is the end facing the surroundings of the element.

The locking arrangements may further each comprise a fixing pin configured to interact with the respective locking pin, wherein, when the fixing pin is in a released position, allow the locking pin to move from the released position to the locked position and vice versa, and, when the locking pin is in the locked position, the fixing pin is configured to be moved to a fixing position in which the fixing pin counter-acts removal of the locking pin from the locked position. By providing a fixing pin for each locking arrangement, the locking pin may be fixed when the locking pin is brought into its locking position, thus ensuring that the locking pin remains in the locked position and preventing unintentional disassembly of the furniture. The interaction of the fixing pin and the locking pin may be provided by providing the locking pin with an aperture and a protrusion within the aperture, and providing the fixing pin with an arresting projection, such that the arresting projection passes the protrusion when the fixing pin is fully inserted into or removed from the aperture of the locking pin, wherein the arresting projection of the fixing pin interacts with the protrusion of the locking pin, such that the insertion force required to urge the fixing pin into the locking pin is smaller than the removal force required to remove the fixing pin from the locking pin. This provides the advantage that it is easier to fix the locking pin than to release the locking pin. The fixing pin may have a longitudinal extent with an upper end and a lower end, the lower end being configured to be inserted into an aperture of the locking pin. The fixing pin may comprise a head provided at an upper end thereof and configured to allow application of an insertion force. This facilitates easy application of an insertion force. The fixing pin may comprise a lower limit projection provided at a lower end of the fixing pin, an upper limit projection provided at an upper end of the fixing pin, wherein the arresting projection is provided between the lower and the upper limit projection, the lower limit projection being configured to allow the fixing pin to be inserted into a locking pin and to resist removal of the fixing pin from the locking pin, the upper limit projection being configured to provide a limit for the maximum insertion of the fixing pin into a locking pin, such that when the upper limit projection abuts the locking pin further insertion of the fixing pin into the locking pin is prevented. This provides the advantage that once the fixing pin is inserted into the locking pin, such that the lower limit projection has passed the locking pin, the fixing pin and locking pin are assembled and disassembly is resisted which eases the handling and operation of the locking arrangement.

The locking arrangement may be regarded as an invention separate from the furniture, and could form the basis of a separate disclosure. The section(s) may in this case be substituted for a first element and the bracing or bracing cross-member may be substituted for a second element. The locking arrangement may thus in this case be used to interlock a first element with a second element, such that the elements cannot be separated in a direction normal to a longitudinal direction of the locking pin.

The above object has in accordance with a second aspect of the invention been achieved by a method for assembling a piece of furniture, comprising the, preferably sequential, steps of:

providing a piece of furniture according to the first aspect of the invention, arranging the first section and the second section such that they are mutually displaced from each other forming a gap there between, joining the male part or parts and the female part or parts of each joint arrangement by inserting the respective dowel in the insertion portion of the respective recess, moving the dowel of each joint arrangement to the locking portion of the recess thereby locking the cross-member to the sections.

This method provides the advantage that the furniture may be assembled with a high degree of mechanical stability but without the use of tools providing a simpler method of assembling furniture.

The method for assembling a piece of furniture, may further comprise the, preferably sequential, steps of:

providing a bracing, positioning the bracing between the sections, such that the bracing abuts the sections thereby counter-acting movement of the sections towards each other, and such that the bracing extends into a first groove in the cross-member at a junction between the cross-member and the first section and/or in the first section and into a second groove in the cross-member at a junction between the cross-member and the second section and/or in the second section.

This method provides the advantage that the assembled bracing counteracts the resiliency of the sections to provide a furniture which is more mechanically stable.

The method for assembling a piece of furniture, may further comprise the, preferably sequential, steps of:

providing the bracing with a locking arrangement in a release position, moving the locking pin of each locking arrangement from a released position to a locked position, thereby locking the bracing to the sections.

This method provides the advantage that the bracing is prevented from being removed accidentally.

The method may potentially further comprise the step of:

moving a fixing pin of each locking arrangement from a released position to a fixing position, thereby fixing the locking pin in the locked position. This ensures that the locking pin remains in the locked position and provides a furniture which is more mechanically stable.

Alternatively, this may be expressed as that the method for assembling a piece of may further comprise the, preferably sequential, steps of:

providing the bracing with a first locking arrangement at a connection between the bracing and the first section and a second locking arrangement at a connection between the bracing and the second section, wherein each locking arrangement comprises a locking pin being movable from a released position to a locked position in which the locking pin interacts with the respective section, moving the bracing, with the respective locking pin in the released position, into a position in-between the sections, moving the locking pin of respective locking arrangement from the released position to the locked position in which the locking pin interacts with the respective section and thereby counter-acts removal of the bracing from the position in-between the sections.

The furniture is preferably wood based and may be manufactured from natural wood. The furniture may be manufactured from glued timber pieces where a plurality of ribs is glued together. The furniture may be manufactured from wood laminates, such as plywood, or from laminates of wood-like materials, such as bamboo. The furniture may be manufactured from wood based composite materials, such as fibreboards, chipboards, or the like.

Preferably the recess is formed directly into the associated furniture part. This may e.g. be performed by drilling and milling the different portions and grooves directly into the associated furniture part.

Preferably the dowel is integrally formed with the associated furniture part. This may e.g. be performed by milling the different portions and protrusions directly into the associated furniture part thereby leaving the dowel as a result of the milling operation. Alternatively, the dowel is formed as a separate member. It may e.g. be formed as a plastic body being formed with ridges and being provided with a through-going axial hole into which a screw is positioned and being screwed into the section or cross-member.

According to another aspect, the invention refers to a furniture with the above combination of features, which furniture is a chair, a bench, a sofa, a couch, a bed, a lamp, or a table.

BRIEF DESCRIPTION OF THE DRAWINGS

The invention will by way of example be described in more detail with reference to the appended schematic drawings, which shows a presently preferred embodiment of the invention.

DETAILED DESCRIPTION OF PREFERRED EMBODIMENTS

It is contemplated that there are numerous modifications of the embodiments described herein, which are still within the scope of the invention as defined by the appended claims.

Figure 6:
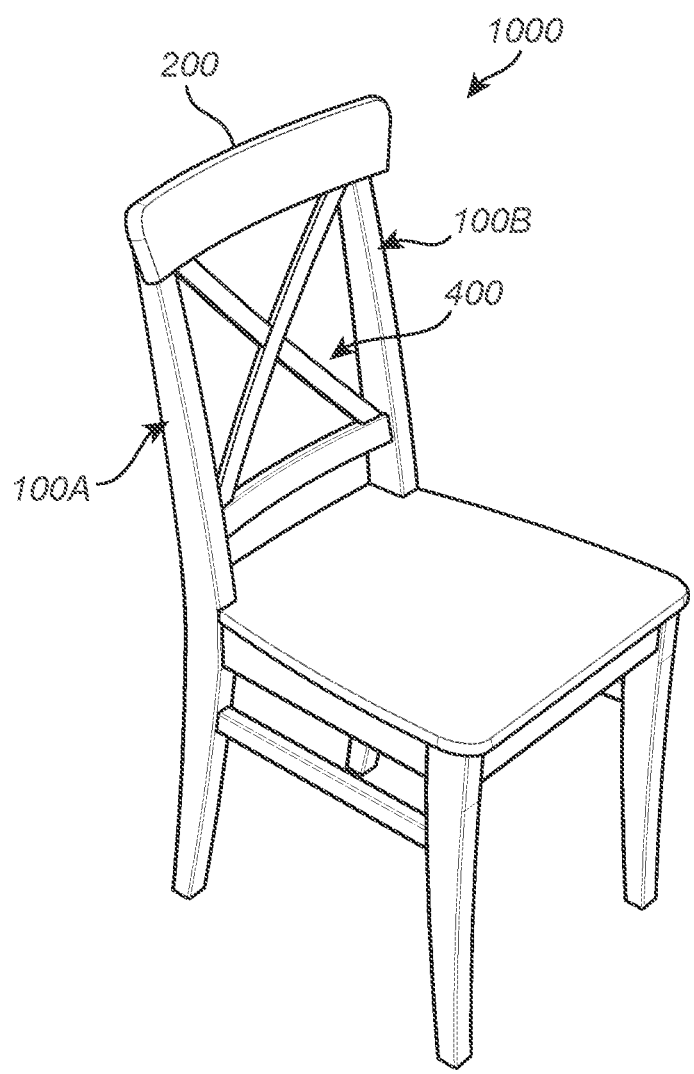
FIG. 6 discloses the invention applied to a furniture in the form of a chair.

In the following the invention, which in its broadest wording relates to a furniture, will be exemplified as applied to a chair 1000, see FIG. 6. The chair 1000 comprises a first section 100A and a second section 100B forming sides of the chair 1000 and being mutually displaced from each other forming a gap G there between. The sections 100A, 100B are connected to each other at a seat cross-member being at a distance from the gap G. The first section 100A and the second section 100B are resilient relative to each other such that the gap G may be partly reduced by application of a force, see FIG. 2E. The chair 1000 further comprises a cross-member 200 configured to connect with the first section 100A and the second section 100B thereby bridging the gap G, such that the cross-member 200 forms a backrest of the chair, the cross-member 200 has a surface 201 configured to face the first section 100A and the second section 100B, see FIG. 1B; a first joint arrangement 210A configured to attach the cross-member 200 to the first section 100A; and a second joint arrangement 210B configured to attach cross-member 200 to the second section 100B. Each of the first 210A and second joint arrangements 210B comprises two pairs of a male 320 and a female part 330.

In this embodiment, each male and female part is substantially the same, except that the female parts 330 of the second joint arrangement 210B are mirrored in a plane normal to the gap direction G relative to the female parts 330 of the first joint arrangement 210A.

Figures 1A, 1B:
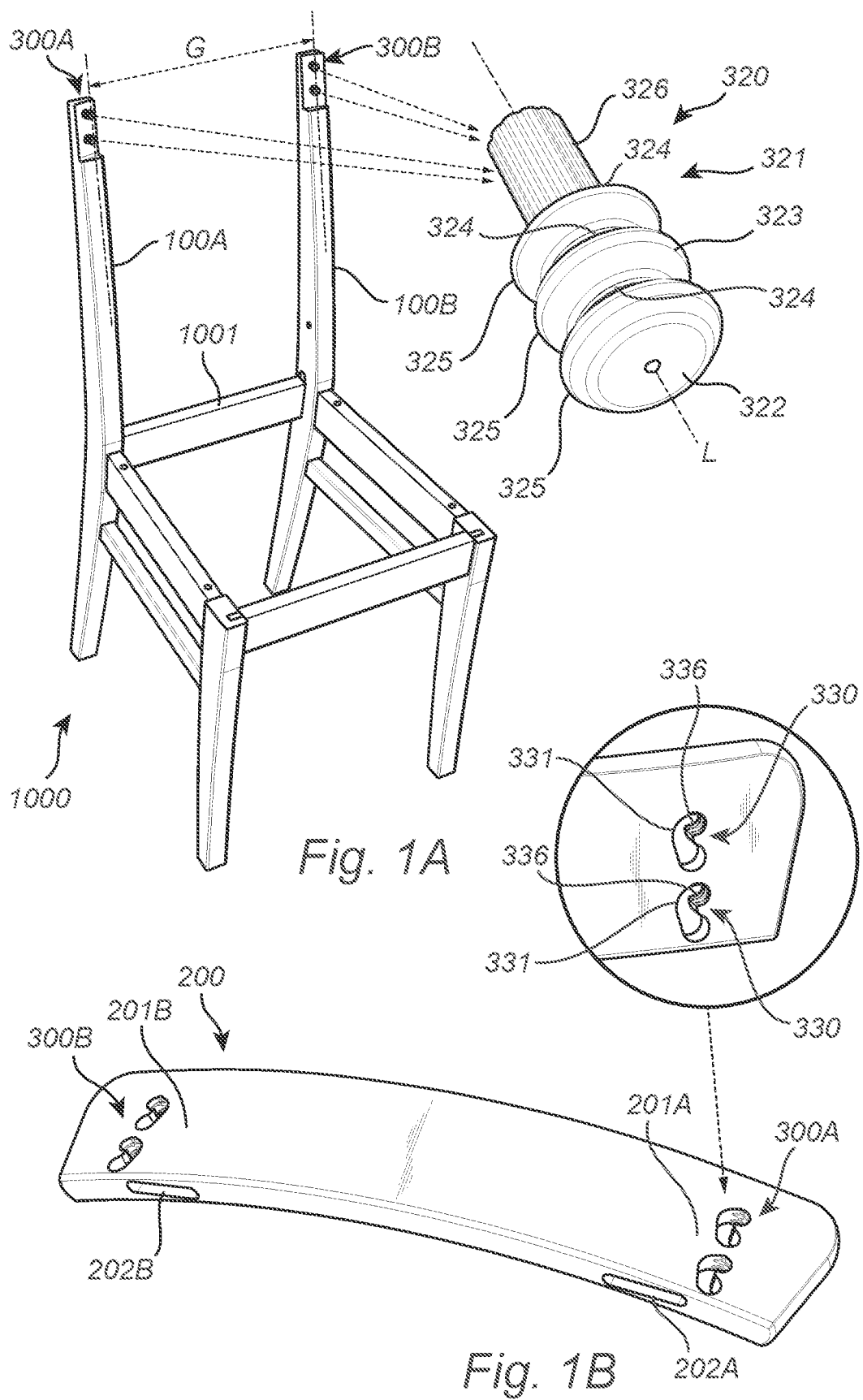
FIG. 1A discloses a male part of a joint arrangement provided on a first and a second section of a furniture.
FIG. 1B discloses a female part of a joint arrangement provided on a cross-member of a furniture.

Each of the male parts 320 is arranged on the respective section 100A, 100B, see FIG. 1A; and each female part 330 is arranged on the surface 201 of the cross-member 200, see FIG. 1B. Each of the male parts 320 is formed by a dowel 321 extending in a longitudinal direction L and having a free end 322 facing away from the surface 101 of the respective section 100A, 100B, see FIG. 1A. Each of the female parts 330 is formed by a recess 331 in the surface 201 of the cross-member 200.

As best seen in FIG. 1A, each dowel 321 has, along the longitudinal direction L from the free end 322 thereof, at least one first portion forming a locking segment 323 and having a first width; and a second portion connected to the first portion and forming a core segment 324 and having a second width being smaller than the first width. In the disclosed embodiment, there are three such locking segments 323 arranged one after another along the longitudinal direction; each being formed by a ridge 325 extending circumferentially around the dowel 321. Between respective pair of ridges there is a core segment 324. In the disclosed embodiment there is also a core segment 324 after the third ridge 325 as counted from the free end 322 of the dowel 321. A core segment 324 between two ridges 325 may also be referred to as a valley extending circumferentially around the dowel 321. The dowel 321 may be integrally formed with the respective section or the cross-member. In the disclosed embodiment, each dowel 321 is a separate member provided with an attachment segment 326 being configured to be inserted into the respective section 100. The attachment segment 326 has a textured surface which facilitates the mounting of the attachment segment 326 to the respective section 100.

Figure 2A:
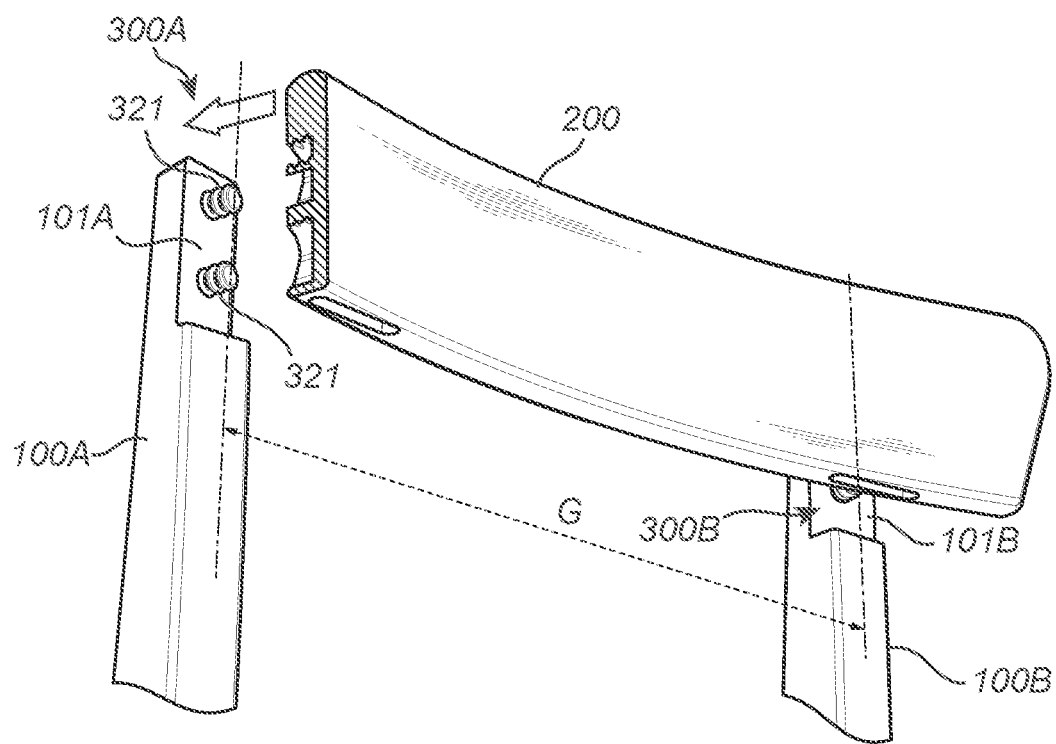
FIGS. 2A-2E schematically discloses the operation of the joint arrangement.
Figure 2B:
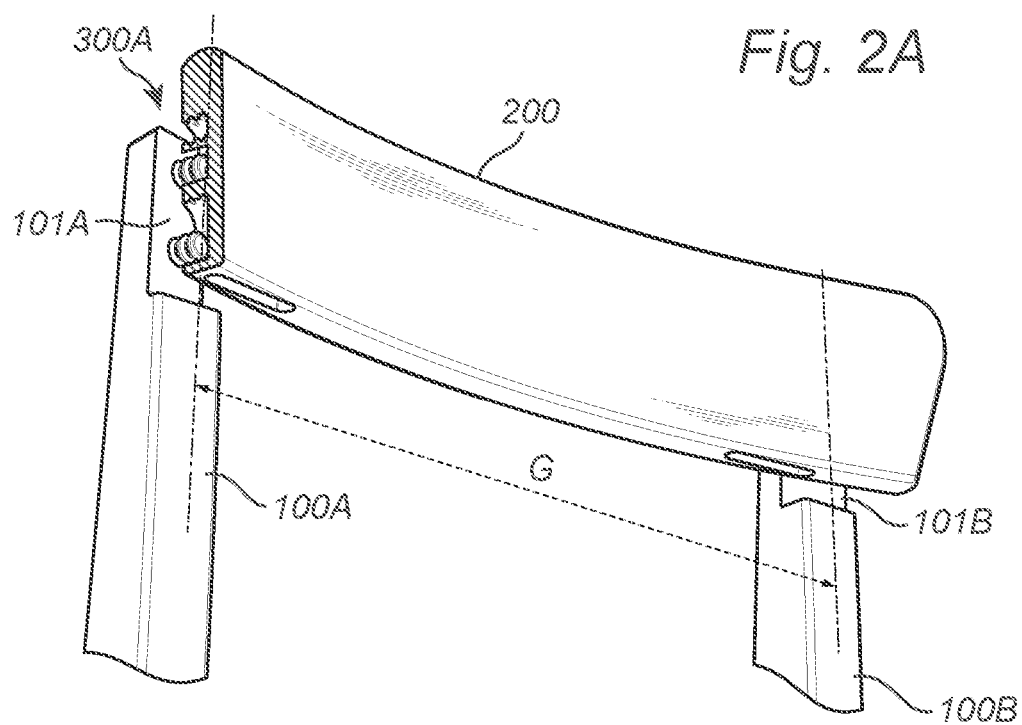
Figure 2C:
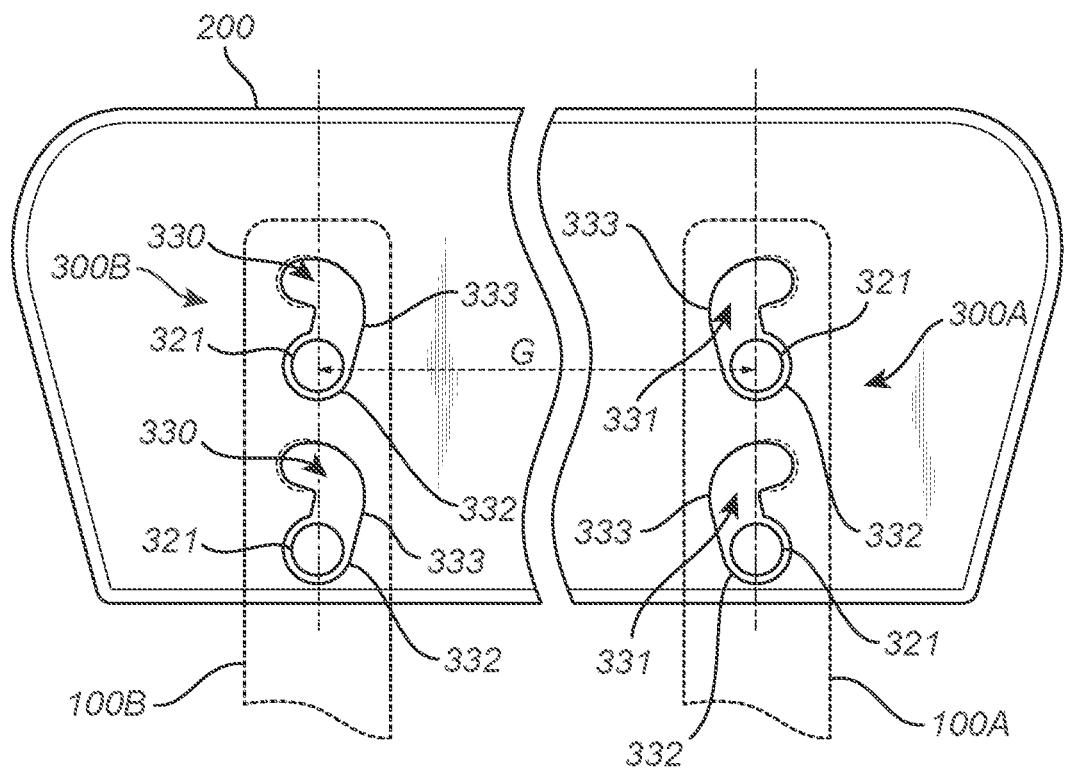
Figure 2D:
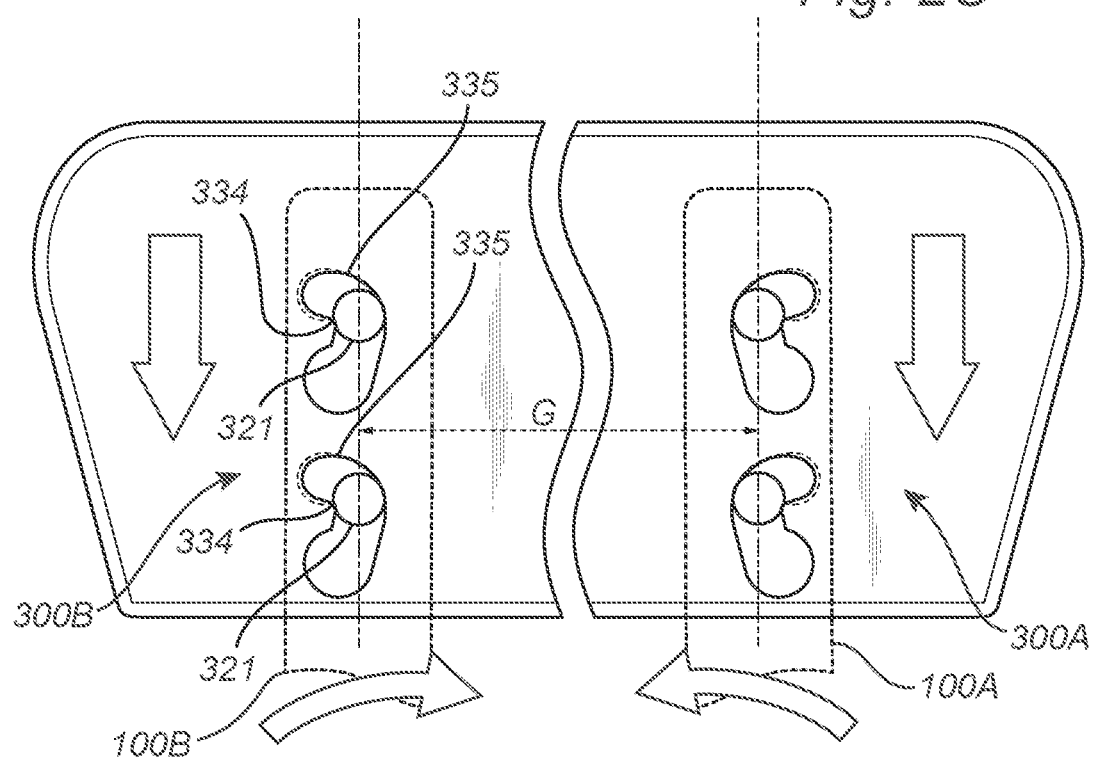

As seen in FIG. 2C and FIG. 2D, the recess 331 has a length extending along the curved recess extent, a width which varies along the recess extent, and a depth. The recess has, along the recess extent an insertion portion 332 with a first width connected to an intermediate portion 333 with a second width connected to a locking portion 335 with a third width. The second width is smaller than the first width, and the third width is smaller than the second width. The intermediate portion 333 has a section biasing portion 334 located at a point along the recess extent having the shortest distance along the direction of the gap G between a recess 331 of the first joint arrangement 300A and a recess 331 of the second joint arrangement 300B. Both a centre point of an insertion portion 332 and a centre point of a locking portion 335 of the first joint arrangement 300A being located at a comparably longer distance from the centre point of respective insertion portion 332 and locking portion 335 of the second joint arrangement 300B. Thereby the sections 100A, 100B are more relaxed when the dowel 321 is in either the insertion portion 332 or the locking portion 335 than when the dowel 321 is at section biasing portion 334. The sections 100A, 100B are completely relaxed when the dowel 321 is in the insertion portion 332. The section biasing portion 334 of the recess 331 is the point where the bias of the dowel 321 changes from being towards the insertion portion 332 to the locking portion 334 instead.

The width of insertion portion 332 is greater than the width of locking segment 323, such that the locking segment of the dowel 321 can be inserted into the insertion portion 332 of the recess 331. The width of locking portion 335 is between the width of the locking segment 323 and the core segment 324. The locking portion 335 of the recess 331 has three grooves 336 each configured to receive the respective one of the three ridges 325 of the dowel 321, such that the recess 331 engages the dowel 321 to prevent removal of the dowel 321 along the longitudinal direction L of the dowel 321. This engagement may be provided with any number of ridges and corresponding grooves, for instance a single ridge and a single groove may be enough to provide adequate engagement, however three ridges and grooves are currently preferred to provide good engagement.

The recess 331 is also shaped such that a geometrical line segment between the centre point of the insertion portion 332 and the centre point of the section biasing portion 334 forms a first slope angle α with the travel direction T and such that a geometrical line segment between the centre point of the section biasing portion 334 and a centre point of the locking portion 335 forms a second slope angle β with the travel direction T, wherein the first slope angle α is smaller than the second slope angle β.

The recess 331 is shaped and oriented such that a geometrical line segment between the insertion portion and the locking portion has a main component orthogonal to the gap. The geometrical line segment is defined as a line between the centre point of the insertion portion 332 to centre point of the locking portion 335. The main component of the geometrical line segment is defined as the magnitude of a projection of the geometrical line segment onto a direction orthogonal to the gap direction, i.e. a direction parallel to the sections 100A, 100B, is greater than the magnitude of a projection of the geometrical line segment onto the gap direction G.

The operation of assembling the furniture will now be described. It is currently preferred that all dowel and recess pairs are operated in substantially the same way, it is contemplated that the dowel and recess pairs may be modified in relation to each other. Firstly, a furniture such as the chair 1000 shown in FIG. 1A is provided, where the first section 100A and the second section 100B are arranged such that they are mutually displaced from each other forming a gap G there between.

Then, each dowel 321 is moved relative to the associated recess 331 in the longitudinal direction L of respective dowel 321 into the insertion portion 332 of the associated recess 331, as seen in FIG. 2A, such that the cross-member 200 abuts the sections 100A, 100B, as seen in FIGS. 2B and 2C. In this position, the sections 100A, 100B are generally in a relaxed position.

As best seen in FIG. 2D, by applying a downwards force on the cross-member 200, the sections 100A, 100B are resiliently forced towards each other providing a partly reduced gap G, and each dowel 321 is moved along the recess extent from the insertion portion 332 to the intermediate portion 333 towards the locking portion 335.

As seen in FIG. 2D, each of the recesses 331 is curved such that as the respective dowel 321 is at the section biasing portion 334 in the intermediate portion 333 of the associated recess 331, the first 100A and second sections 100B are resiliently forced even further towards each other providing an even further reduced gap G.

Figure 2E:
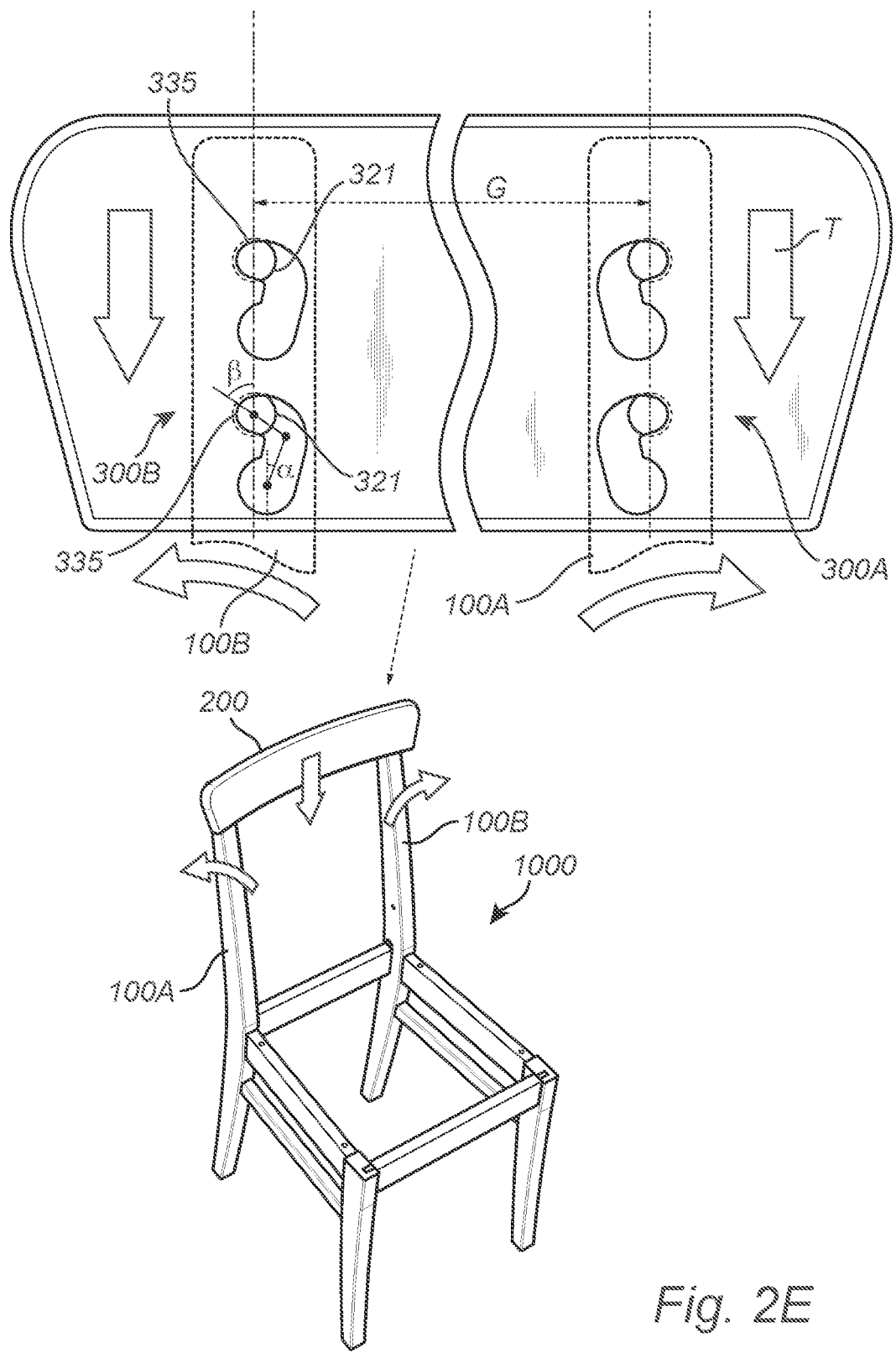

As the respective dowel 321 passes the section biasing portion 334, the sections 100A, 100B are relaxed compared to when the dowel 321 is at the section biasing portion 334, thereby providing a bias of the dowel 321 towards the locking portion 335 once the dowel 321 has been transferred past the section biasing portion 334, as seen in FIG. 2E. To ensure that the dowel 321 has fully reached the locking portion 335 a force may be applied to the sections 100A, 100B to force them away from each other, urging the dowel 321 into the locking portion 335, as seen in FIG. 2E.

Figure 3:
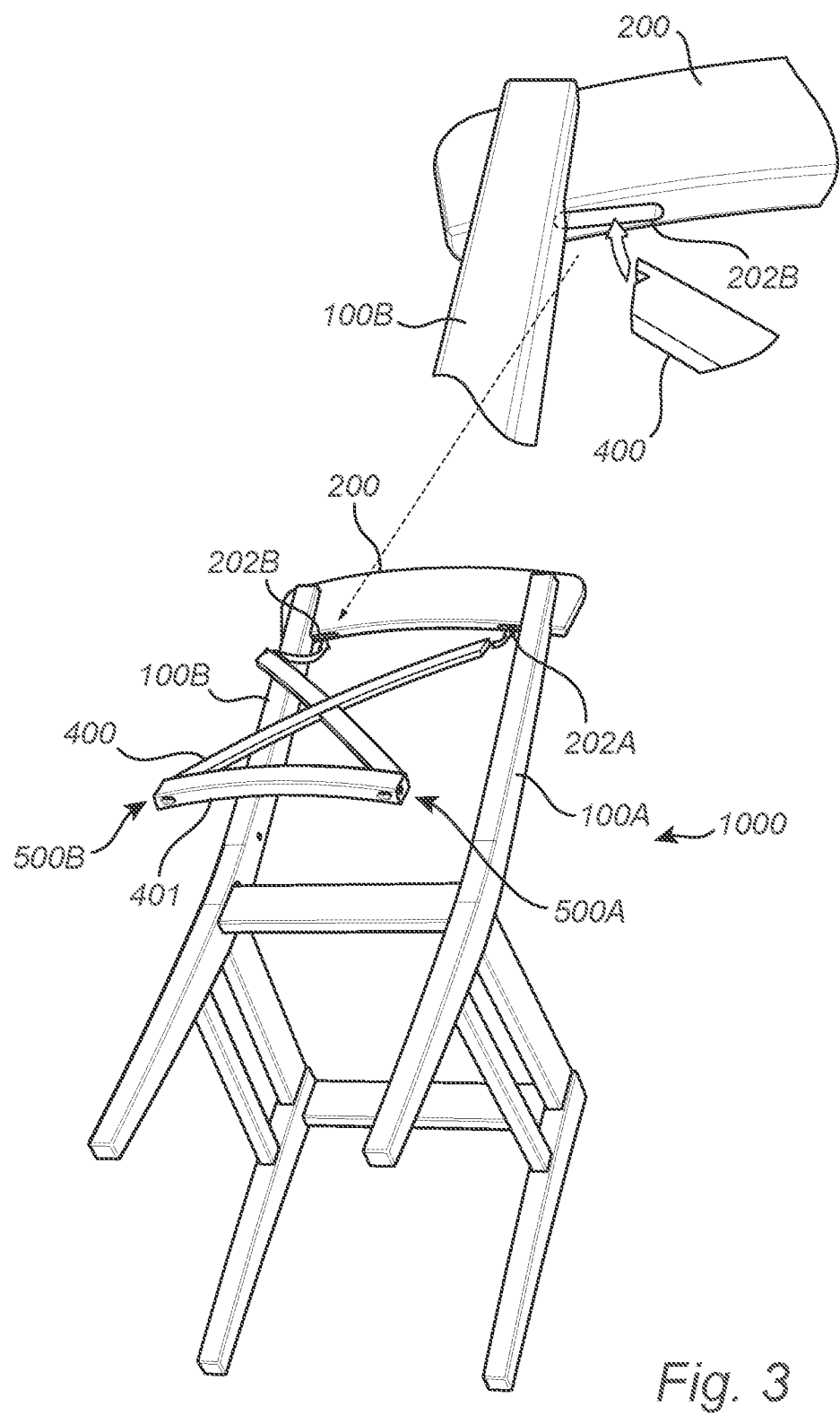
FIG. 3 schematically discloses the operation of applying a bracing to the furniture.

Turning now to FIG. 3, the furniture 1000 further comprising a bracing 400 configured to be positioned between the sections 100A, 100B to abut the sections 100A, 100B thereby counter-acting movement of the sections 100A, 100B towards each other. The bracing 400 form substantially an X-shape and additionally comprise a bracing cross-element which is configured to support two lower ends of the X-shape of the bracing and to bridge the distance between the sections 100A, 100B. The bracing 400 is configured to extend into a first groove 202A and into a second groove 202B in the cross-member. The first groove 202A is located at a junction between the cross-member 200 and the first section 100A and the second groove 202B is located at a junction between the cross-member 200 and the second section 100B. The grooves 202A, 202B in the cross-member 200 extend beyond the junction between the cross-member 200 and the respective section 100A, 100B in the direction of the cross-member 200. The bracing 400 comprise a right-angled notch at the top end of the X-shape abutting at least two surfaces of each respective section 100A, 100B. The bracing 400 comprises a first locking arrangement 500A at a connection between the bracing cross-member 401 and the first section 100A and a second locking arrangement 500B at a connection between the bracing cross-member 401 and the second section 100B.

Figure 4A:
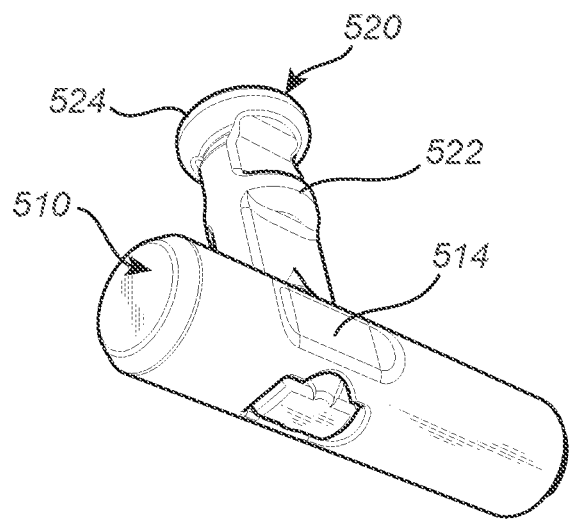
FIGS. 4A-4C discloses a locking arrangement with a locking pin and a fixing pin.
Figure 4B:
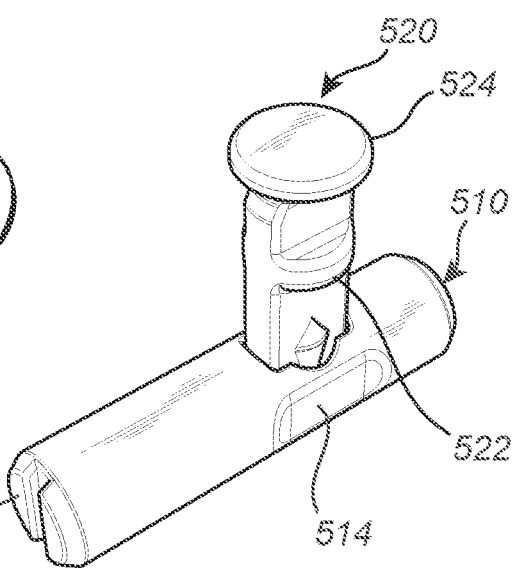
Figure 4C:
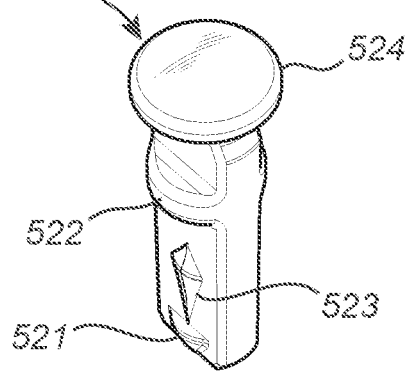
Figure 4C:
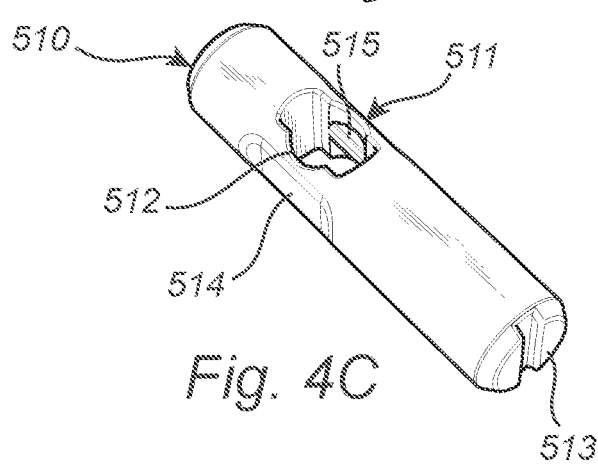

As best seen in FIGS. 4A-4C, each locking arrangement 500 comprises a locking pin 510 and a fixing pin 520. The locking pin 510 is configured to be moved from a released position to a locked position in which the locking pin 510 interacts with the respective section 100A, 100B. The locking pins 510, when in the locked positions, counter-act removal of the bracing 400 from in-between the sections 100A, 100B. The locking pin 510 has a longitudinal cylindrical extent with a lower and an upper end, the lower end being configured to be inserted into an accommodating hole 501 of locking arrangement 500. The locking pin 510 comprises a tool interface 513 with a straight slot, provided at an upper end of the locking pin 510 and configured to interface with a screwdriver (not shown). The locking pin 510 comprises two depressions 514 arranged on opposing sides of the locking pin 510. The locking pin is provided with an aperture 511 and a protrusion 515 within the aperture 511. The aperture 511 is configured to receive the fixing pin 520. The fixing pin 520 has a longitudinal extent with an upper end and a lower end. The lower end is configured to be inserted into the aperture 511 of the locking pin 510. The fixing pin comprises a head 524 provided at an upper end thereof. The head 524 is configured to allow application of an insertion force by having a flat surface to facilitate the application of a force by a user. The fixing pin 520 is provided with an arresting projection 523 configured such that the arresting projection 523 passes the protrusion 515 of the locking pin 510 when the fixing pin 520 is fully inserted into or removed from the aperture of the locking pin 510. The arresting projection 523 of the fixing pin 520 interacts with the protrusion 515 of the locking pin 510, such that the insertion force required to urge the fixing pin 520 into the locking pin 510 is smaller than the removal force required to remove the fixing pin 520 from the locking pin 510 by providing the arresting projection 523 with a relatively gentle slope in the direction of insertion of the fixing pin 520 and a relatively steeper slope in the direction of removal of the fixing pin 520. The fixing pin 520 comprises a lower limit projection 521 provided at a lower end of the fixing pin 520, and an upper limit projection 522 provided at an upper end of the fixing pin 520. The arresting projection 523 is provided between the lower 521 and the upper limit projection 522. The lower limit projection 521 is configured to allow the fixing pin 520 to be inserted into the locking pin 510 and to resist removal of the fixing pin 520 from the locking pin 510. The upper limit projection 522 is configured to provide a limit for the maximum insertion of the fixing pin 520 into the locking pin 510, such that when the upper limit projection 522 abuts the locking pin further insertion of the fixing pin 520 into the locking pin 510 is prevented.

Figure 5A:
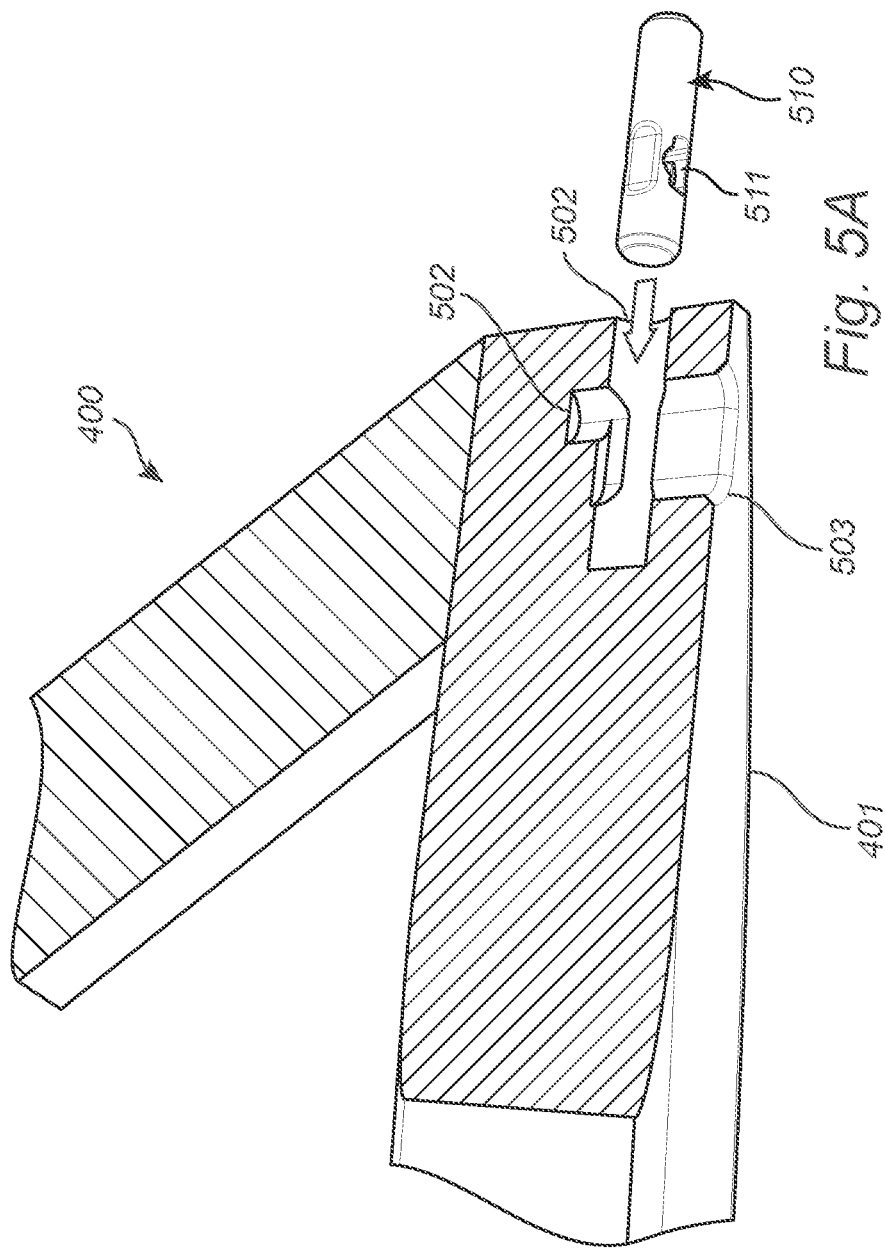
FIGS. 5A-5G schematically discloses the operation of a locking arrangement.

The method of operating the locking arrangement is disclosed in FIGS. 5A-5F. As best seen in FIG. 5A, the lower end of the locking pin 510 is inserted into an accommodating hole 501 in the bracing cross-member 401 such that the locking pin 510 is flush with the surface adjacent to the accommodating hole 501, such that the locking pin is in the release position.

Figure 5B:
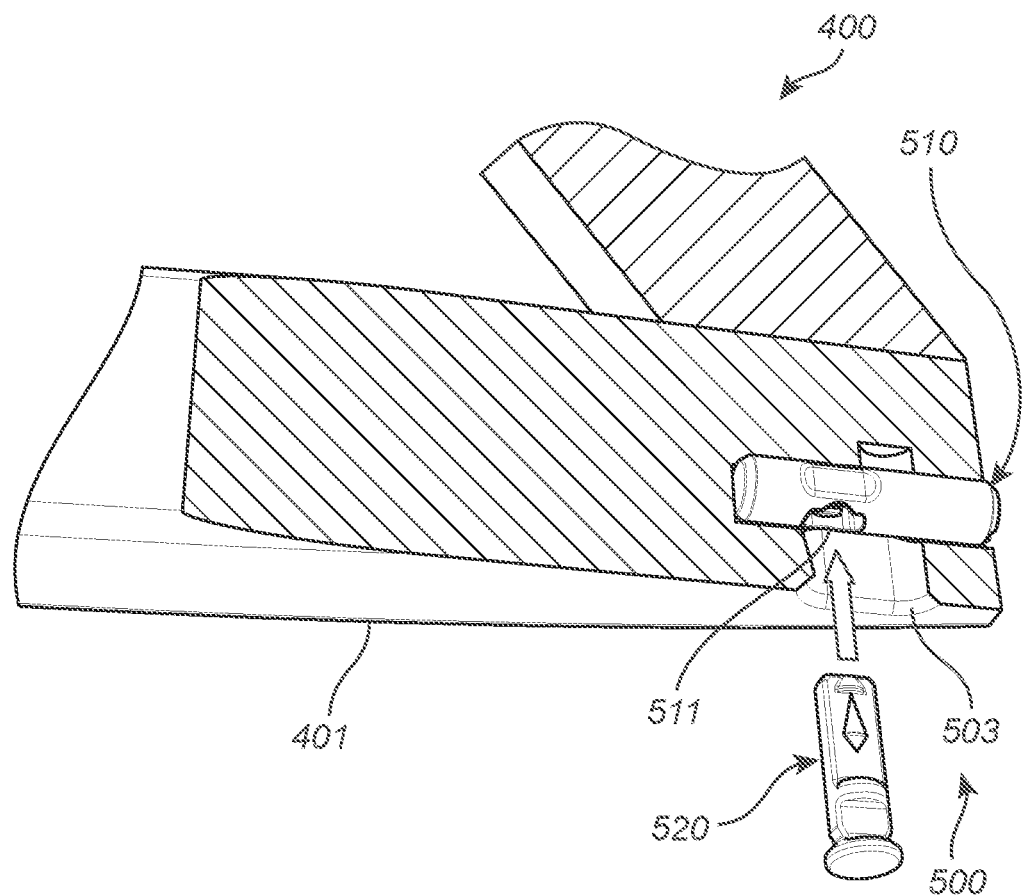
Figure 5C:
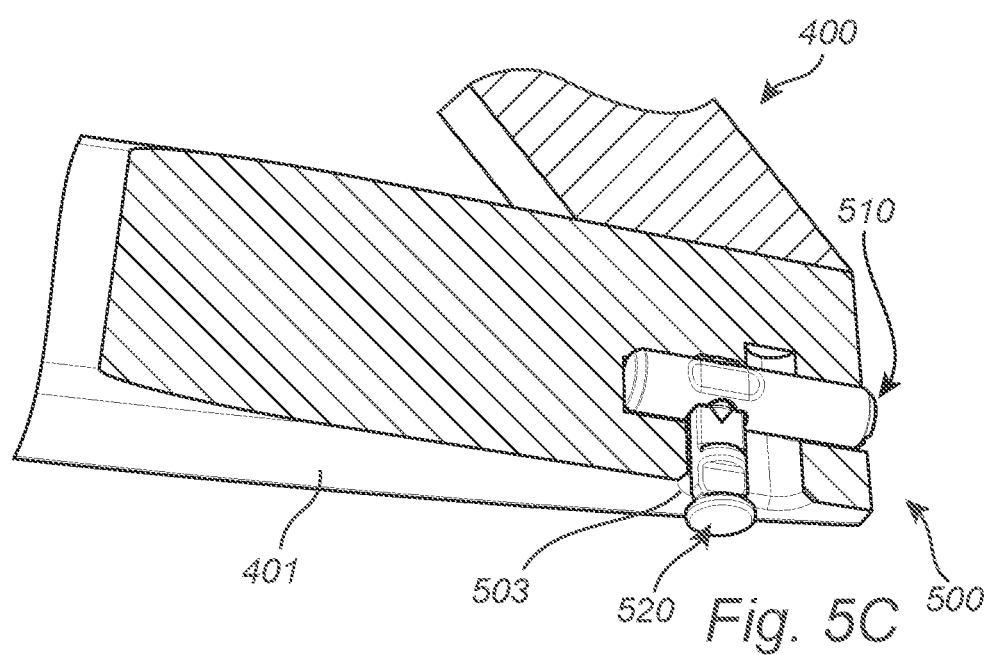

Then, as seen in FIG. 5B, the lower end of the fixing pin 520 is inserted into the aperture 511 of the locking pin 510 via the slot 503 of the bracing cross-member 401 to move the fixing pin 520 to the released position by applying a pushing force to the head 524 of the fixing pin 520. In the released position of the fixing pin, the lower limit projection 521 has passed the protrusion 515, as seen in FIG. 5C. In this location the head 524 of the fixing pin 520 projects above the surface adjacent to the slot 503. The bracing cross-member 401 is now prepared for joining to a section 100.

When the fixing pin 520 is in a released position, the locking pin 510 is allowed to move from the released position to the locked position and vice versa, and, when the locking pin 510 is in the locked position, the fixing pin 520 can be moved to a fixing position in which the fixing pin 520 counter-acts removal of the locking pin 510 from the locked position.

Figure 5D:
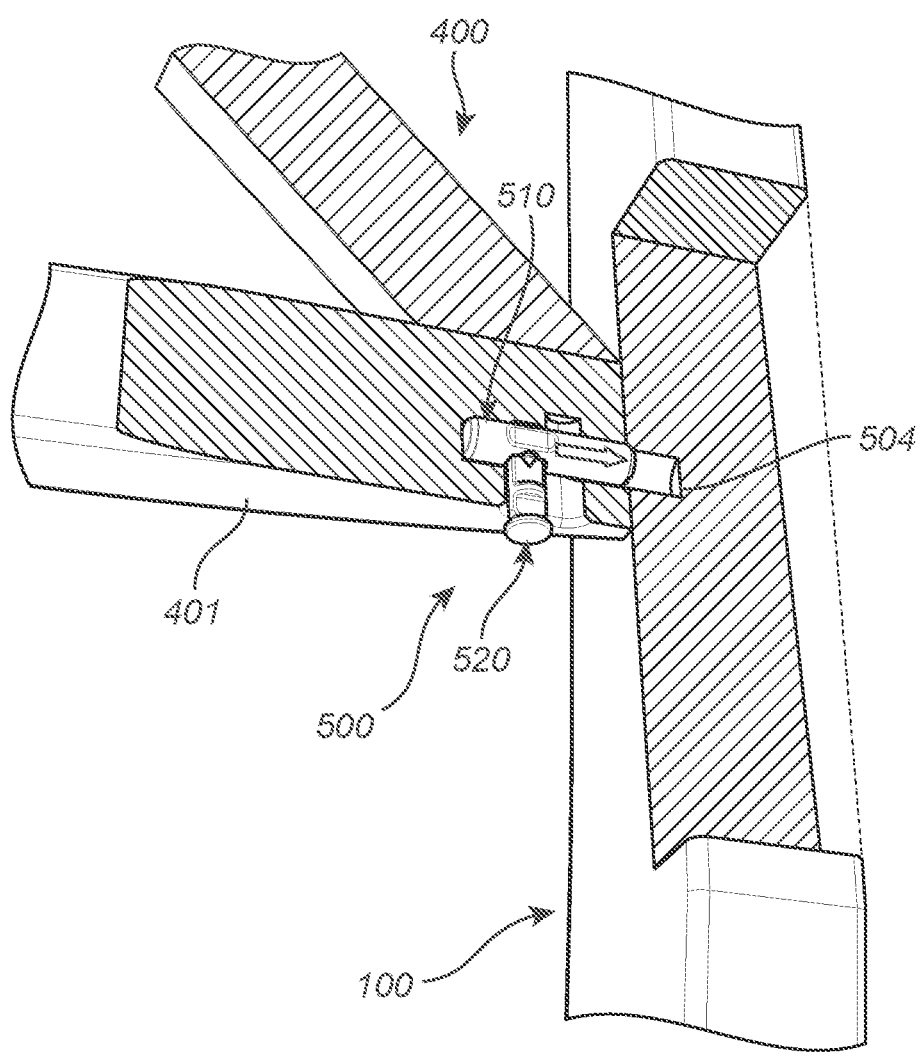

Turning to FIG. 5D, the bracing cross-member 401 is arranged such that the accommodating hole 501 and a locking hole 504 of the section 100 abut coaxially. The locking pin 510 is then urged into the locking hole 504 of the section 100 by applying a transverse force to the portion of the fixing pin 520 protruding from the slot 503, such that the locking pin 510 is moved to the locked position. By this action the fixing pin 520 is positioned such that the lower end thereof is adjacent to a fixing hole 502 of the bracing cross-member 401.

Figure 5E:
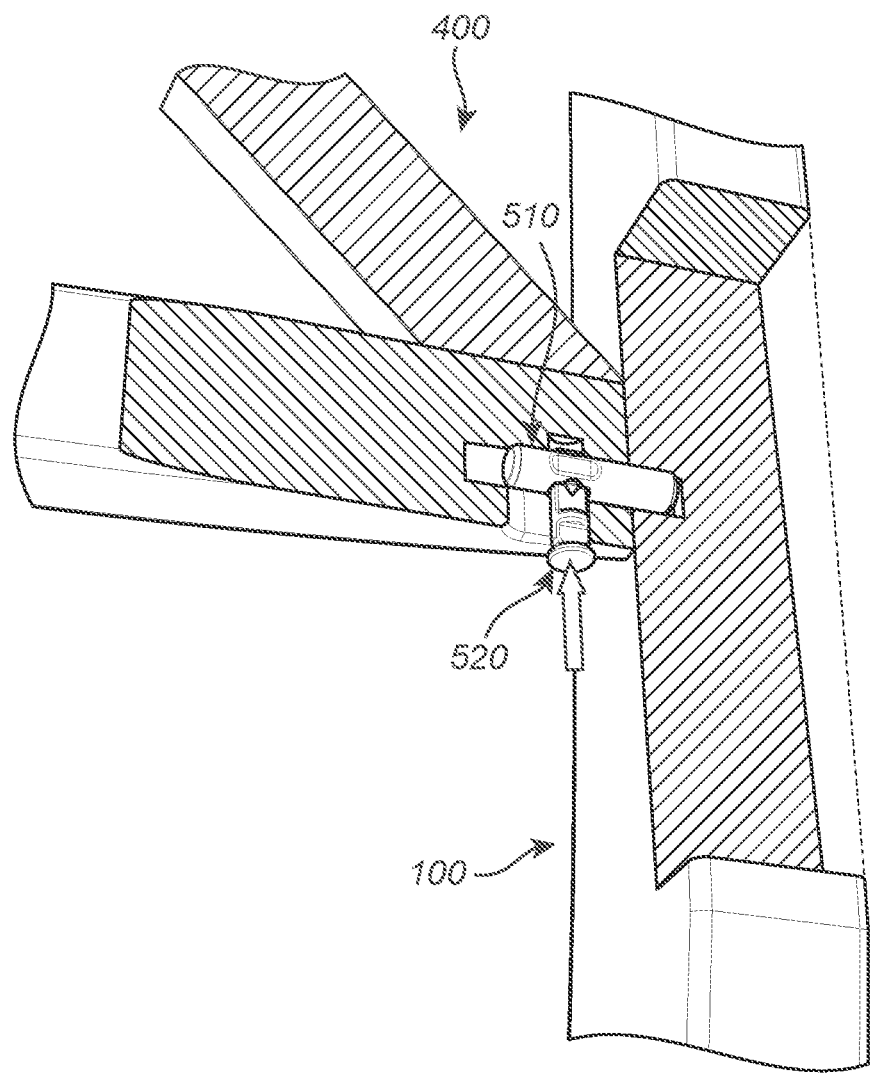
Figure 5F:
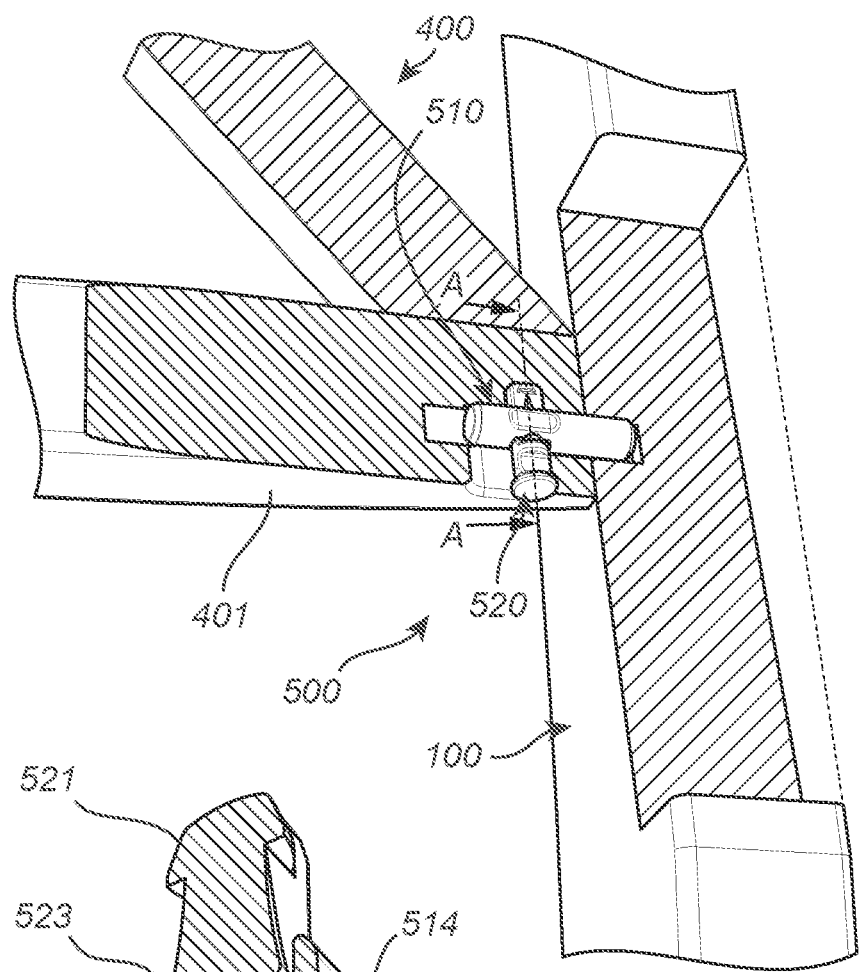
Figure 5G:
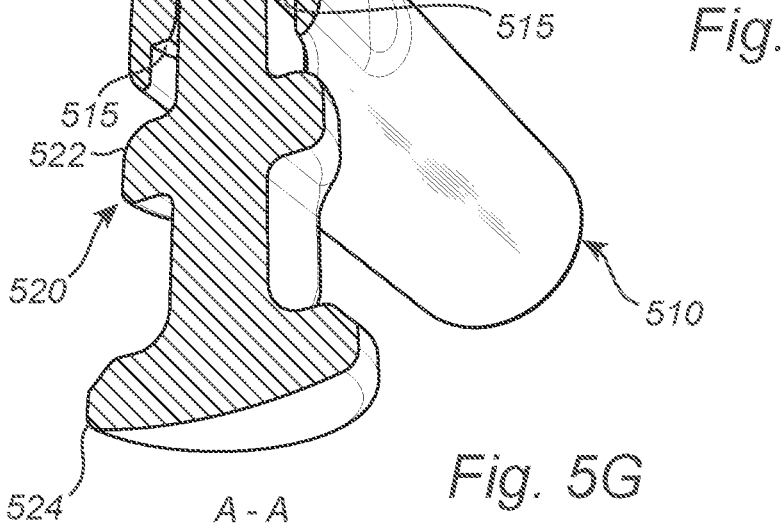

As seen in FIG. 5E, the application of a pushing force to the head 524 of the fixing 520 urges the fixing pin 520 into the fixing hole 502 of the bracing cross-member 401 until either the fixing pin 520 abuts the bottom of the fixing hole 502 or the upper limit projection 522 abuts the locking pin 510, as seen in FIG. 5F such that the fixing pin 520 is moved to the fixing position. In this movement the arresting projection 523 passes the protrusion 515 such that removal of the fixing pin 520 from the locking pin 510 is resisted as seen in FIG. 5G.

LIST OF REFERENCES 1000 furniture
1001 seat cross-member
100 section
101 surface
G gap
T travel direction
200 cross-member
201 surface
202 groove
300 joint arrangement
320 male part
321 dowel
322 free end
323 locking segment
324 core segment
325 ridge
326 attachment segment L longitudinal direction
330 female part
331 recess
332 insertion portion
333 intermediate portion
334 section biasing portion
335 locking portion
336 groove
α, β slope angles
400 bracing
401 bracing cross-member
500 locking arrangement
501 accommodating hole
502 fixing hole
503 slot
504 locking hole
510 locking pin
511 aperture
512 notch
513 tool interface
514 depression
515 protrusion
520 fixing pin
521 lower limit projection
522 upper limit projection
523 arresting projection
524 head In this disclosure and on the drawings, the suffix A and B of a reference number denote a reference associated with the respective side of the first section (A) or the side of the second section (B) of the furniture.

The invention claimed is:

1. A piece of furniture comprising:
 a first section and a second section mutually displaced from each other forming a gap there between;
 wherein the first section and the second section are resilient relative to each other such that the gap may be widened or partly reduced by application of a force;
 a cross-member configured to connect with the first section and the second section thereby bridging the gap, the cross-member having a surface configured to face the first section and the second section;
 a first joint arrangement configured to attach the cross-member to the first section; and
 a second joint arrangement configured to attach the cross-member to the second section;
 wherein each of the first and second joint arrangement comprise a pair of:
  a male part being arranged either on the surface of the cross-member or being arranged on the respective first or second section; and
  a female part being arranged on the other one of the surface of the cross-member and the respective first or second section;
 wherein each of the male parts is formed by a dowel extending in a longitudinal direction and having a free end facing away from a surface of the respective section or away from the surface of the cross-member,
 wherein each of the female parts is formed by a recess in the surface of the cross-member or in the surface of the respective section, the recess having a recess extent with an insertion portion, an intermediate portion, and a locking portion,
 whereby the respective dowel is configured to first be moved relative to the associated recess in the longitudinal direction of the respective dowel into the insertion portion and thereafter be moved along the recess extent via the intermediate portion to the locking portion by moving the cross-member relative to the first and second sections in a travel direction having a main component orthogonal to the gap,
 wherein the locking portion is configured to engage with the dowel such that the dowel is prevented from being removed from the associated recess along a longitudinal direction of the dowel when the dowel is located in the locking portion of the associated recess,
 wherein the recess is shaped such that as the respective dowel passes a section biasing portion in the intermediate portion of the associated recess, the first and second sections are resiliently forced away from each other providing a widened gap or forced towards each other providing a reduced gap and as the dowel reaches the locking portion the sections are relaxed compared to when the dowel passes the section biasing portion, thereby providing a bias of the dowel towards the locking portion once it has been transferred past the section biasing portion.

2. A piece of furniture according to claim 1, wherein each recess has a curved extent such that when the dowel is positioned in the insertion portion, the sections are relaxed as compared to when the dowel passes the section biasing portion.

3. A piece of furniture according to claim 1, wherein each recess is shaped and oriented such that a geometrical line segment between the insertion portion and the locking portion has a main component orthogonal to the gap.

4. A piece of furniture according to claim 1, wherein a geometrical line segment between a centre point of the insertion portion and a centre point of the section biasing portion forms a first slope angle ($\alpha$) with the travel direction being smaller than a second slope angle ($\beta$) between the travel direction and a geometrical line segment between the centre point of the section biasing portion and a centre point of the locking portion.

5. A piece of furniture according to claim 1, wherein each joint arrangement comprises:
 at least two pairs of male and female parts,
  the male part of each pair being arranged either on the surface of the cross-member or on the respective section,
  the female part of each pair being arranged on the other one of the surface of the cross-member or the respective section, thereby complementing the male part of the same pair.

6. A piece of furniture according to claim 1, wherein the male part or parts are arranged on the respective section, and the female part or parts are arranged on the surface of the cross-member.

7. A piece of furniture according claim 1, wherein the sections, apart from being connected to each other by the cross-member, also are connected to each other at another position being at a distance from the gap, the distance being measured orthogonally to the gap, and the distance being at least 25% of the gap.

8. A piece of furniture according to claim 1, wherein the recess has a length extending along the recess extent, a depth, and a width which varies with the recess extent and with the depth,
 wherein:
  the insertion portion has a first width;
  the locking portion has a mouth having a third width being smaller than the first width,
  wherein the dowel has, along the longitudinal direction from the free end thereof:

a first portion forming a locking segment and having a first width; and a second portion connected to the first portion and forming a core segment and having a second width being smaller than the first width, wherein the first width of the recess is greater than the first width of the dowel, such that the dowel can be inserted into the insertion portion of the recess, and the third width of the recess is between the first and the second width of the dowel, such that the dowel is prevented from being removed along a longitudinal direction of the dowel once in the locking portion of recess.

9. A piece of furniture according to claim 1, wherein the recesses are shaped and orientated such that when the respective dowel passes the section biasing portion in the intermediate portion of the associated recess, the first and second sections are resiliently forced towards each other providing a reduced gap.

10. A piece of furniture according to claim 9, further comprising a bracing configured to be positioned between the sections to abut the sections thereby counter-acting movement of the sections towards each other.

11. A piece of furniture according to claim 10, wherein the bracing is configured to extend into a first groove in the cross-member at a junction between the cross-member and the first section and/or in the first section and into a second groove in the cross-member at a junction between the cross-member and the second section and/or in the second section.

12. A piece of furniture according to claim 10, wherein the bracing comprises a first locking arrangement at a connection between the bracing and the first section and a second locking arrangement at a connection between the bracing and the second section, each locking arrangement comprising a locking pin configured to be moved from a released position to a locked position in which the locking pin interacts with the respective section, wherein the locking pins, when in the locked positions, counter-act removal of the bracing from a position in-between the sections.

13. A piece of furniture according to claim 12, wherein each locking arrangement further comprises a fixing pin configured to interact with the respective locking pin, wherein, when the fixing pin is in a released position, the locking pin is allowed to move from the released position to the locked position and vice versa, and, when the locking pin is in the locked position, the fixing pin is configured to be moved to a fixing position in which the fixing pin counter-acts removal of the locking pin from the locked position.

14. A method for assembling a piece of furniture, comprising the sequential steps of:

providing a piece of furniture according to claim 1, arranging the first section and the second section such that they are mutually displaced from each other forming a gap there between, joining the male part or parts and the female part or parts of each joint arrangement by inserting the respective dowel in the insertion portion of the respective recess, and moving the dowel of each joint arrangement to the locking portion of the recess, thereby locking the cross-member to the sections.

15. A method according to claim 14 for assembling a piece of furniture, further comprising steps of:

providing a bracing, and positioning the bracing between the sections, such that the bracing abuts the sections thereby counter-acting movement of the sections towards each other, and such that the bracing extends into a first groove in the cross-member at a junction between the cross-member and the first section and/or the first section and into a second groove in the cross-member at a junction between the cross-member and the second section and/or in the second section.

16. A method according to claim 15, the method further comprising providing the bracing with a first locking arrangement at a connection between the bracing and the first section and a second locking arrangement at a connection between the bracing and the second section, wherein each locking arrangement comprises a locking pin being movable from a released position to a locked position in which the locking pin interacts with the respective section, moving the bracing, with the respective locking pin in the released position, into a position in-between the sections, and moving the locking pin of the respective locking arrangement from the released position to the locked position in which the locking pin interacts with the respective section and thereby counter-acts removal of the bracing from the position in-between the sections.

\* \* \* \* \*